United States Patent
Kalderon et al.

(10) Patent No.: US 11,625,559 B2
(45) Date of Patent: Apr. 11, 2023

(54) ATTENUATING VISUAL ARTIFACTS OF IMAGE PROCESSING SYSTEMS USING ADVERSARIAL NETWORKS ON-THE-FLY

(71) Applicant: Intel Corporation, Santa Clara, CA (US)

(72) Inventors: Avi Kalderon, Santa Clara, CA (US); Gilad Michael, Sunnyvale, CA (US); Joao Peralta Moreira, Mountain View, CA (US); Bhavin Nayak, Santa Clara, CA (US); Furkan Isikdogan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 16/833,263

(22) Filed: Mar. 27, 2020

(65) Prior Publication Data
US 2020/0226429 A1 Jul. 16, 2020

(51) Int. Cl.
  *G06K 9/62* (2022.01)
  *G06N 3/04* (2006.01)
  *G06N 3/08* (2006.01)

(52) U.S. Cl.
  CPC ......... *G06K 9/6264* (2013.01); *G06K 9/6257* (2013.01); *G06K 9/6265* (2013.01); *G06N 3/04* (2013.01); *G06N 3/08* (2013.01)

(58) Field of Classification Search
  CPC .. G06K 9/6264; G06K 9/6257; G06K 9/6265; G06N 3/04; G06N 3/08
  See application file for complete search history.

(56) References Cited

U.S. PATENT DOCUMENTS

| | | | | |
|---|---|---|---|---|
| 9,256,927 | B2 * | 2/2016 | Lischinski | G06T 5/008 |
| 10,467,526 | B1 * | 11/2019 | Appalaraju | G06V 10/449 |
| 2011/0246521 | A1 * | 10/2011 | Luo | G16H 30/20 707/E17.014 |
| 2018/0247153 | A1 * | 8/2018 | Ganapati | A61B 1/000096 |
| 2018/0330247 | A1 * | 11/2018 | Cohen | G06F 30/20 |
| 2019/0188539 | A1 * | 6/2019 | Lee | G06V 30/19173 |
| 2019/0198156 | A1 * | 6/2019 | Madani | G06V 10/764 |
| 2019/0266701 | A1 | 8/2019 | Isikdogan et al. | |
| 2020/0160511 | A1 * | 5/2020 | Lyman | H04L 67/12 |

FOREIGN PATENT DOCUMENTS

WO WO-2008084352 A1 * 7/2008 ........... A61B 6/5258

OTHER PUBLICATIONS

Liu, Yimeng et al. "A no-reference metric for evaluating the quality of motion deblurring", ACM Transactions on Graphics, ACM, NY, US , vol. 32, No. 6, Nov. 2013, 12 Pages.
Leo, Isikdogan F et al. "Eye Contact Correction using Deep Neural Networks", 2020 IEEE Winter Conference on Application of Computehr Vision (WACV), IEEE, Mar. 1, 2020, pp. 3307-3315.
European Search Report for EPO Patent Application No. 20217288. 8, dated Jun. 15, 2021, 9 pages.

* cited by examiner

Primary Examiner — Qun Shen
(74) Attorney, Agent, or Firm — Jordan IP Law, LLC

(57) ABSTRACT

An apparatus, method, and a computer readable medium for attenuating visual artifacts in processed images. An annotated dataset of images to be processed by an image processing system is created. An adversarial control network is trained to operate as an image quality expert in classifying images. After the adversarial control network has been trained, the adversarial control network is used to supervise the image processing system on-the-fly.

21 Claims, 9 Drawing Sheets

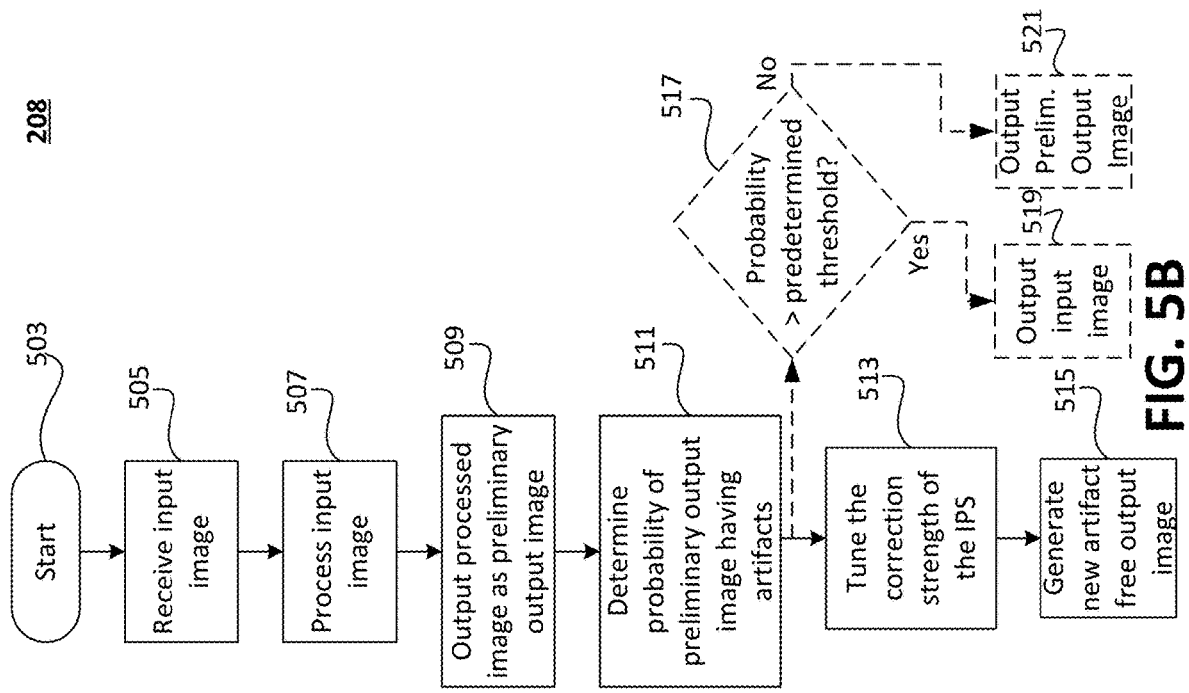

ATTENUATING VISUAL ARTIFACTS OF IMAGE PROCESSING SYSTEMS USING ADVERSARIAL NETWORKS ON-THE-FLY

TECHNICAL FIELD

Embodiments generally relate to image processing systems. More particularly, embodiments relate to attenuating visual artifacts of image processing systems using adversarial networks on-the-fly.

BACKGROUND

Image processing is a method of performing operations on an image in order to obtain an enhanced image or to extract useful information from the image. A common problem with imaging and computer vision related tasks is an image artifact. An image artifact is a feature that appears in an image that is not present in the original imaged object.

One method of image processing uses hand-tuned control mechanisms to attenuate visual artifacts. However, these mechanisms require a trade-off between correction strength and artifact prevention. Using the control mechanisms aggressively results in weak correction, whereas reducing its strength fails to prevent the appearance of visual artifacts in some corner cases.

BRIEF DESCRIPTION OF THE DRAWINGS

The various advantages of the embodiments will become apparent to one skilled in the art by reading the following specification and appended claims, and by referencing the following drawings, in which:

FIGS. 5A and 5B illustrate an example method of using an adversarial control network to supervise an image processing system on-the-fly according to an embodiment;

Figure 1:
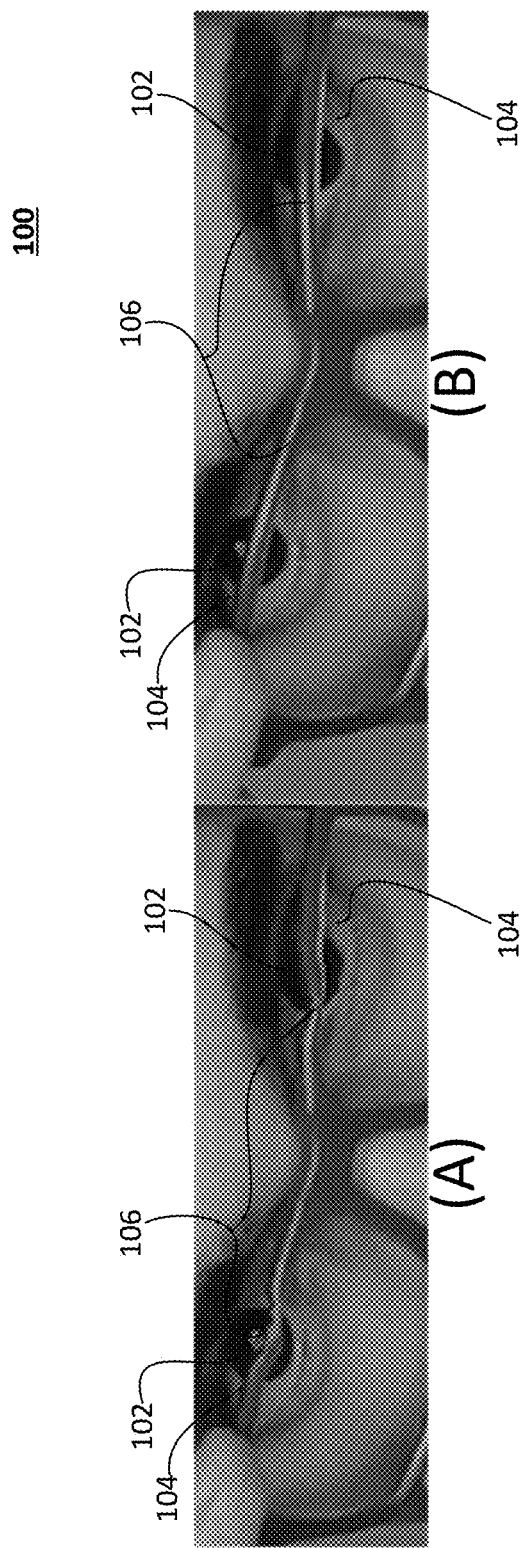
FIG. 1 illustrates an example of an image output using a traditional eye contact corrector image processing system and an example image output of an eye contact corrector image processing system using an adversarial control network on-the-fly according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to provide a system that enables on-the-fly control of image processing systems using adversarial networks to attenuate image processing artifacts. This is accomplished by supervising the output of an image processing system in inference time. The image processing system takes an input image and outputs a manipulated version of the input image. The output of the image processing system is sent to an adversarial network. The adversarial network detects whether any noticeable image processing artifacts exist in the manipulated version of the input image. In one embodiment, the output of the adversarial network is used to tune the image processing system and an artifact free output image is generated. In another embodiment, the output of the adversarial network is used to decide whether to output the manipulated version of the input image or the input image itself by enabling or disabling the image processing system. In other words, the adversarial network acts as a human image quality expert by making "good-to-go" and "not-good-to-go" decisions for every processed image of the image processing system in real-time.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1, image (A) illustrates an example of an image output using a traditional eye contact corrector image processing system and FIG. 1, image (B) illustrates an example image output of an eye contact corrector image processing system using an adversarial control network on-the-fly according to an embodiment. In diagram 100, the image processing system is an Eye Contact Correction Model (ECCM). The ECCM is used for illustrative purposes only. One skilled in the relevant art(s) would know that any type of image processing system may be used without departing from any of the embodiments described herein.

One function of the ECCM is to move the gaze from any arbitrary direction to center to correct eye contact during video conferencing. With respect to FIG. 1, image (A), the ECCM uses hand-tuned control mechanisms to attenuate visual artifacts. However, hand-tuned control mechanisms require a trade-off between correction strength and artifact prevention. If one chooses to use the hand-tuned control mechanisms aggressively, a weak correction results. Whereas reducing the correction strength results in the appearance of visual artifacts in some corner cases. In FIG. 1, image (A), the ECCM output illustrates a corner case in which hand-tuned control mechanisms using a reduced correction strength resulted in the appearance of visual artifacts. The ECCM output of FIG. 1, image (A) shows the pupils 102 of one's eyes 104 being obstructed by his eyeglass frames 106. As shown, the eyeglass frames 106 exhibit unnatural warping artifacts across the top rim of the frames at the pupils.

In FIG. 1, image (B), an adversarial control network embodiment was used in place of the hand-tuned control mechanisms. In this embodiment, the ECCM output shows the eyeglass frames without any visual artifacts. In other words, the top rim of the frames do not show any warping artifacts from the obstruction of the pupils 102 by the eyeglass frames 106. As shown, the adversarial control network prevented the ECCM from producing the visual artifacts, thereby improving the naturalness of the generated/modified output image. In this embodiment, the adversarial control network is used as an inference-time, supervisor model of the ECCM or image processing system. In other words, the adversarial control network runs in inference time and supervises the outputs of the image processing system to result in attenuation/elimination of visual artifacts.

Such supervised image processing systems do not require the capacity to fix the artifacts and do not need to be differentiable. In fact, supervised image processing systems are capable of supervising any black-box image processing system. The results of traditional image processing systems may be improved with this supervised system without having to retrain the traditional image processing systems.

Figure 2:
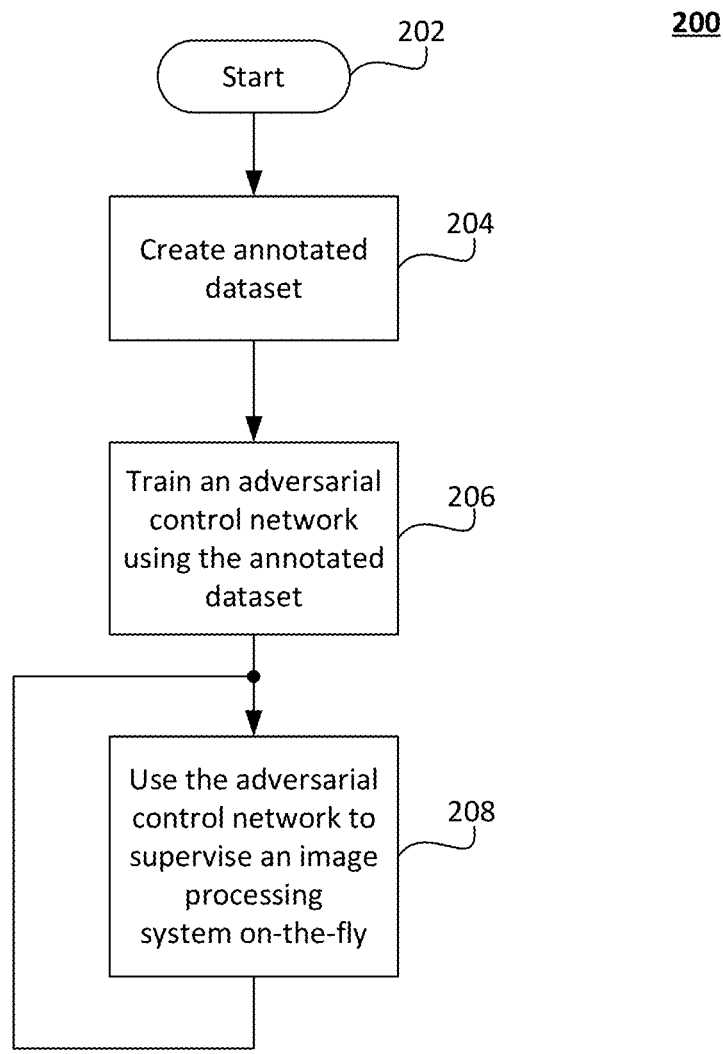
FIG. 2 is a flow diagram of an example method of attenuating visual artifacts of image processing systems using adversarial control networks on-the-fly according to an embodiment.

FIG. 2 is a flow diagram of an example method 200 for attenuating visual artifacts of image processing systems using adversarial control networks on-the-fly according to an embodiment. The method 200 may generally be implemented in a system that runs parallel with an image processing system to supervise the image processing system. More particularly, the method 200 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 200 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 202, where the process immediately proceeds to block 204. In block 204 an annotated dataset is created that consists of images to be processed by an image processing system. This process is performed once. The process then proceeds to block 206.

In block 206, an adversarial control network is trained using the annotated dataset. The adversarial control network comprises a neural network that is trained to operate as an image quality expert in classifying images output from the image processing system. In one embodiment, the neural network may be a convolutional neural network (CNN). In other embodiments, the neural network may be any type of neural network that may be trained to imitate an image quality expert. This process is also performed once. The process then proceeds to block 208.

In block 208, the adversarial control network, trained in block 206, is used to supervise the image processing system on-the-fly. It is an adversarial control network because it is used to catch the failures of the image processing system that it supervises. For every image input into the image processing system, the adversarial control network analyzes the output image processed by the image processing system to predict whether the output image is a poorly-processed image or a well-processed image. The prediction of the adversarial control network is used to build a control mechanism that tunes the image processing system. In one embodiment, when the adversarial network predicts a not-good output image that would lead to noticeable artifacts, the image processing system is turned-off for that output image and the input image corresponding to that output image is used instead. When the adversarial control network prediction results in a good output image that would not lead to noticeable artifacts, the image processing system remains on and the output image is used.

In another embodiment, the probability of the output image being of not-good quality may be used to tune the correction strength of the image processing system smoothly instead of turning the image processing system off. In one embodiment, probabilities are accumulated over time to temporally smooth the correction strength.

This process is repeated for each input image into the image processing system. In other words, the process remains at block 208 to handle the next input image into the image processing system.

Figure 3B:
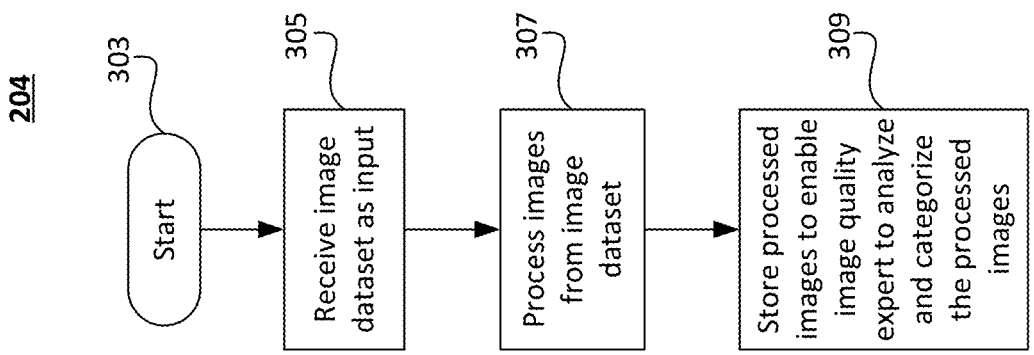
FIGS. 3A and 3B illustrate an example method of creating an annotated dataset for an image processing system according to an embodiment.
Figure 3A:
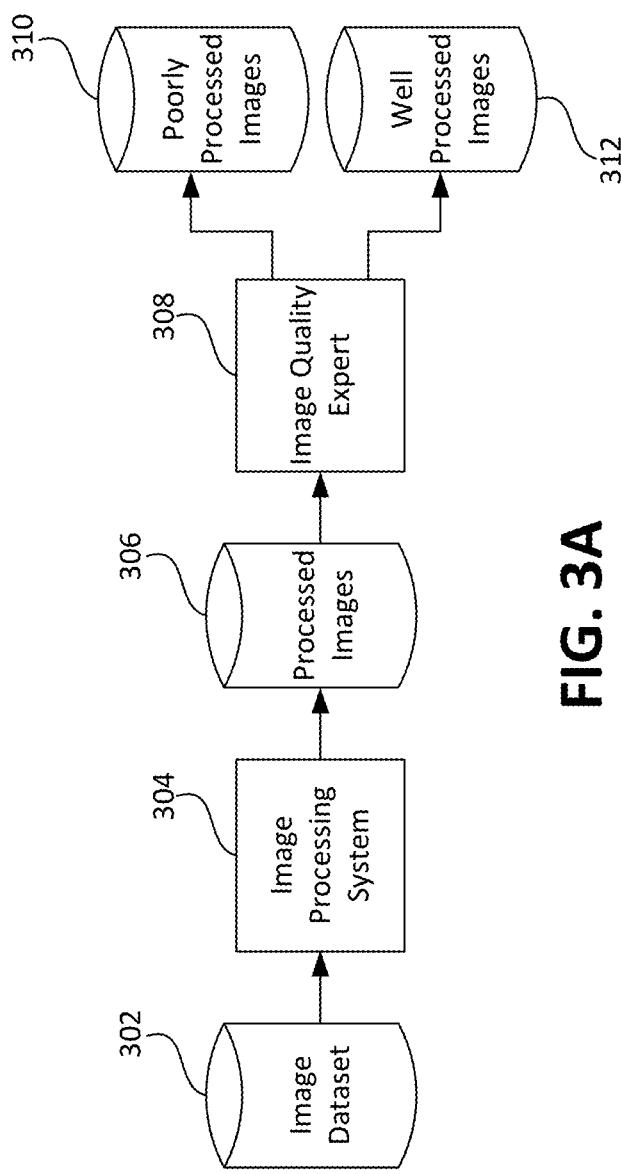

FIGS. 3A and 3B illustrate an example method 204 for creating the annotated dataset for an image processing system according to an embodiment. The method 204 may generally be implemented in a system that runs parallel with an image processing system to supervise the image processing system. More particularly, the method 204 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 303 where the process immediately proceeds to block 305. In block 305, an image processing system 304 receives images in an image dataset from database 302. The process then proceeds to block 307.

In block 307, the image processing system 304 processes the images from the image data set. The process then proceeds to block 309.

In block 309, the processed images are stored in database 306. Once all the processed images have been stored, an image quality expert will analyze the processed images and categorize them into two groups: "good/well processed images" and "not good/poorly processed images". The "good/well processed images" are images that have no noticeable artifacts. The "good/well processed images" are stored in database 312. The "not good/poorly processed images" are images that do have noticeable artifacts. The "not good/poorly processed images" are stored in database 310.

Figure 4B:
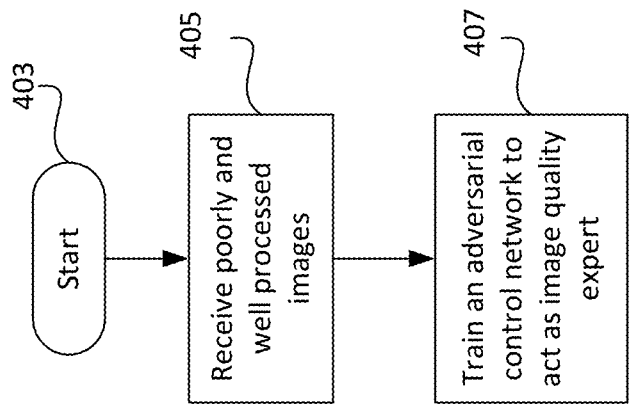
FIGS. 4A and 4B illustrate an example method of training an adversarial control network using human annotated "good" and "not good" images according to an embodiment.
Figure 4A:
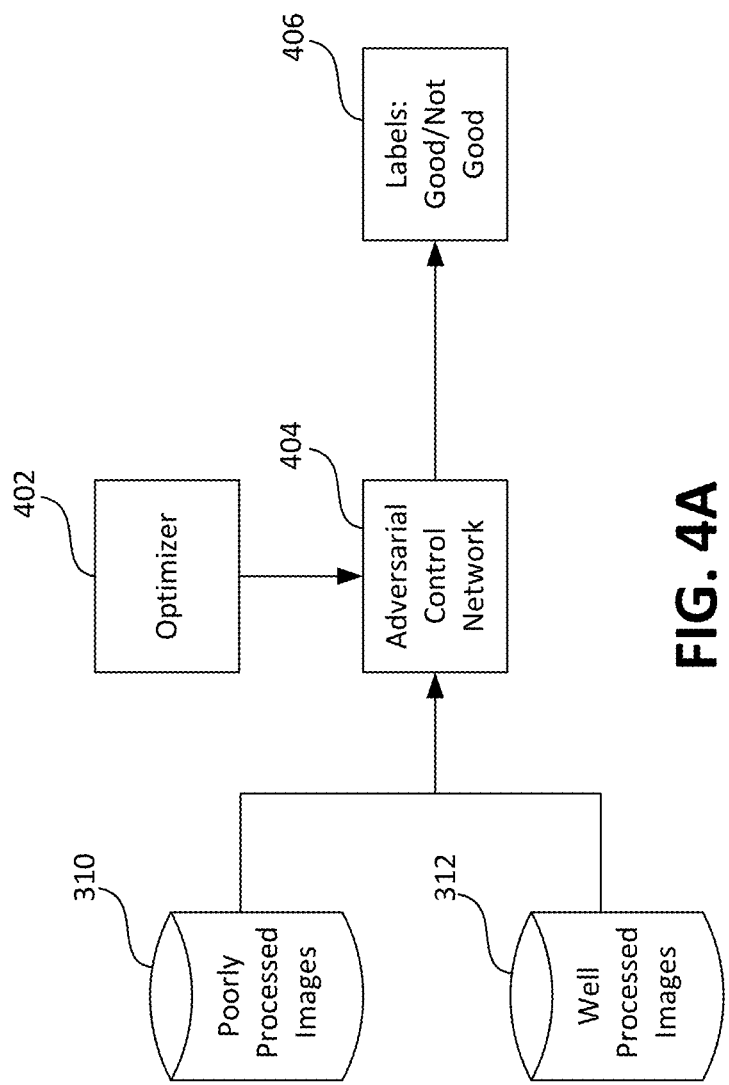

FIGS. 4A and 4B illustrate an example method 206 for training an adversarial control network using human annotated "good" and "not good" images according to an embodiment. The method 206 may generally be implemented in a system that runs parallel with an image processing system to supervise the image processing system. More particularly, the method 206 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 403, where the process immediately proceeds to block 405. In block 405, the adversarial control network 404 receives the poorly processed images from database 310 and the well processed images from database 312. As indicated earlier the adversarial control network 404 is a convolutional neural network. The process then proceeds to block 407.

In block 407, optimizer 402 is used to train the adversarial control network 404 to act as a human image quality expert by adjusting the weight parameters of the neural network to minimize the loss/error between the network's output and the images found in the dataset. The adversarial control network is learning that a "not good" label should be associated with the poorly processed images and a "good label" should be associated with the well processed images. For example, if the adversarial control network 404 receives a poorly processed image from database 310, the optimizer 402 tunes the parameters of the adversarial control network 404 to output a label indicating "not good". Alternatively, if the adversarial control network 404 receives a well processed image from database 312, the optimizer 402 tunes the parameters of the adversarial control network 404 to output a label indicating "good".

FIGS. 5A and 5B illustrate an example method 208 for using an adversarial control network to supervise an image processing system on-the-fly according to an embodiment. The method 208 may generally be implemented in a system that runs parallel with an image processing system to supervise the image processing system. More particularly, the method 208 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 503 where the process immediately proceeds to block 505. In block 505, an image 502 is input into a first instance of an image processing system 504. The first instance of the image processing system 504 operates at 100% strength. The process then proceeds to block 507.

In block 507, the first instance of the image processing system 504 processes the input image 502. The process then proceeds to block 509.

In block 509, the processed image from the first instance of the image processing system 504 is output as a preliminary output image 506. The process then proceeds to block 511.

In block 511, the adversarial control network 508 receives as input the preliminary output image 506. The adversarial control network 508 analyzes the preliminary output image 506 and outputs a probability of the preliminary output image 506 being artifact free.

In one embodiment, the adversarial control network 508 may receive as input the input image 502 and the preliminary output image 506. In this instance, the adversarial control network 508 analyzes both inputs 502 and 506 and outputs a probability of the preliminary output image 506 being artifact free. The process then proceeds to block 513.

In an embodiment in which the image processing system 504 includes control logic that allows adjustment of the control strength of the image processing system 504, in block 513, the correction strength of the image processing system 504 (shown as a second instance of the image processing system 504 in FIG. 5A) is tuned based on the probability output of the adversarial control network 508. The process then proceeds to block 515.

In block 515, the second instance of the image processing system 504 processes the input image 502 to output an artifact free output image 510.

Returning to block 511, in one embodiment, if the probability of the preliminary output image having artifacts is greater than a predetermined threshold, block 513 is bypassed. In other words, the second instance of the image processing system 504 is not tuned and the system outputs the input image 502 as the artifact free output image 510.

In an embodiment in which the image processing system 504 does not include control logic that allows adjustment of the control strength of the image processing system 504, the system may act as a binary system. In this instance (shown as dotted lines in FIG. 5B), the system bypasses/turns off the second instance of the image processing system 504 and outputs the input image 502 (block 519) as the artifact free output image 510 if the probability of the preliminary output image 506 having artifacts exceeds a predetermined threshold (decision block 517) and outputs the preliminary output image 506 (block 521) as the artifact free output image 510 if the probability of the preliminary output image 506 having artifacts is less than the predetermined threshold (decision block 517).

Figure 6:
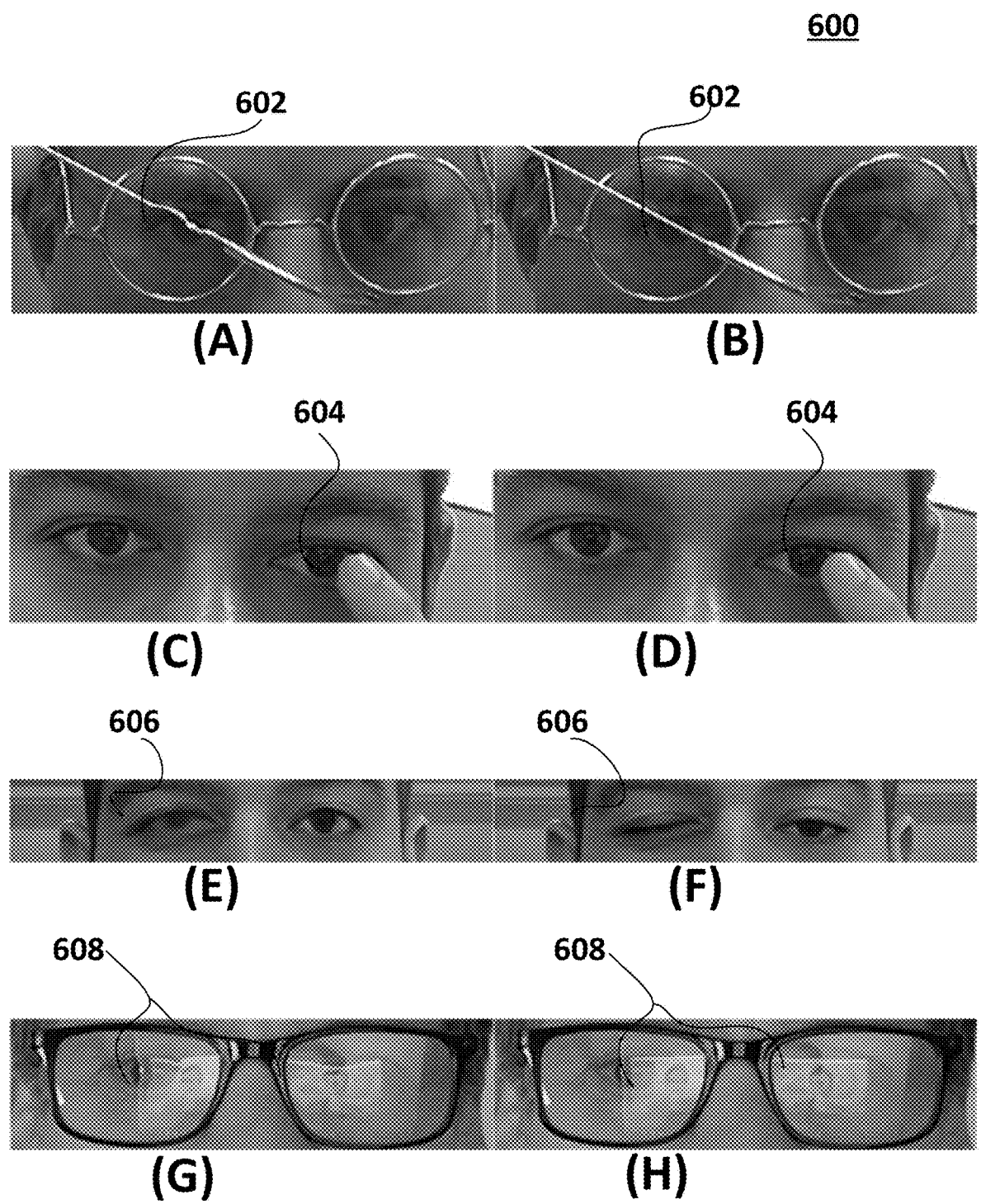
FIG. 6 illustrates examples of traditional image processing system outputs and examples of image processing system outputs with the use of adversarial networks that enables on-the-fly control of the image processing system according to an embodiment.

FIG. 6, images (A), (C), (E), and (G) illustrate examples of image processing system outputs without the use of adversarial control networks and FIG. 6, images (B), (D), (F), and (H) illustrate examples of image processing system outputs with the use of adversarial networks that enable on-the-fly control of the image processing system according to an embodiment. In diagram 600, the image processing system is the Eye Contact Correction Model (ECCM). The ECCM is used for illustrative purposes only. One skilled in the relevant art(s) would know that any type of image processing system may be used without departing from any of the embodiments described herein.

As previously indicated with respect to FIG. 1, one function of the ECCM is to move the gaze from any arbitrary direction to center to correct eye contact during video conferencing. With respect to FIG. 6, images (A), (C), (E), and (G), the ECCM uses hand-tuned control mechanisms to attenuate visual artifacts. As previously indicated, hand-tuned control mechanisms result in a trade-off between correction strength and artifact prevention. If one chooses to use the hand-tuned control mechanisms aggressively, a weak correction results. Whereas reducing the correction strength results in the appearance of visual artifacts in some corner cases.

In FIG. 6, images (A), (C), (E), and (G), the ECCM output illustrates several corner cases in which hand-tuned control mechanisms using a reduced correction strength resulted in the appearance of visual artifacts. In FIG. 6, image (A), the eyeglass handle 602 is the object that is obstructing the left eye/pupil. As shown in FIG. 6, image (A), the image of the eyeglass handle 602 is warped. In FIG. 6, image (C), a finger 604 is the object that is obstructing the right eye/pupil. As shown in FIG. 6, image (C), the finger 604 is slightly warped. In FIG. 6, image (E), an eye lid blinking 606 is the object that is obstructing the left eye/pupil. As shown in FIG. 6, image (E), the eye lid 606 is blurred. In FIG. 6, image (G), reflections 608 appearing in the lenses of the eyeglasses of both the left and right eyes are the objects that are obstructing the left and right eyes/pupils. As shown in FIG. 6, image (G), the reflections 608 appearing in both lenses of the eyeglasses are warped.

In FIG. 6, images (B), (D), (F), and (H), an adversarial control network that enables on-the-fly control of the image processing system embodiment was used in place of the hand-tuned control mechanisms. As shown in FIG. 6, images (B), (D), (F), and (H), the adversarial control network prevented the ECCM from producing the visual artifacts, thereby improving the naturalness of the generated/modified output image. The adversarial control network was used as an inference-time, supervisor model of the ECCM or image processing system. In other words, the adversarial control network ran in inference time and supervised the outputs of the image processing system, as described above with reference to FIGS. 5A and 5B, to result in attenuation/elimination of visual artifacts. As shown in FIG. 6, image (B), the eyeglass handle 602 is not warped, in FIG. 6, image (D), the finger 604 is not warped, in FIG. 6, image (F), the eyelid 606 is not blurred and in FIG. 6, image (H), the reflections 608 in each lens of the eyeglasses are not warped.

Figure 7:
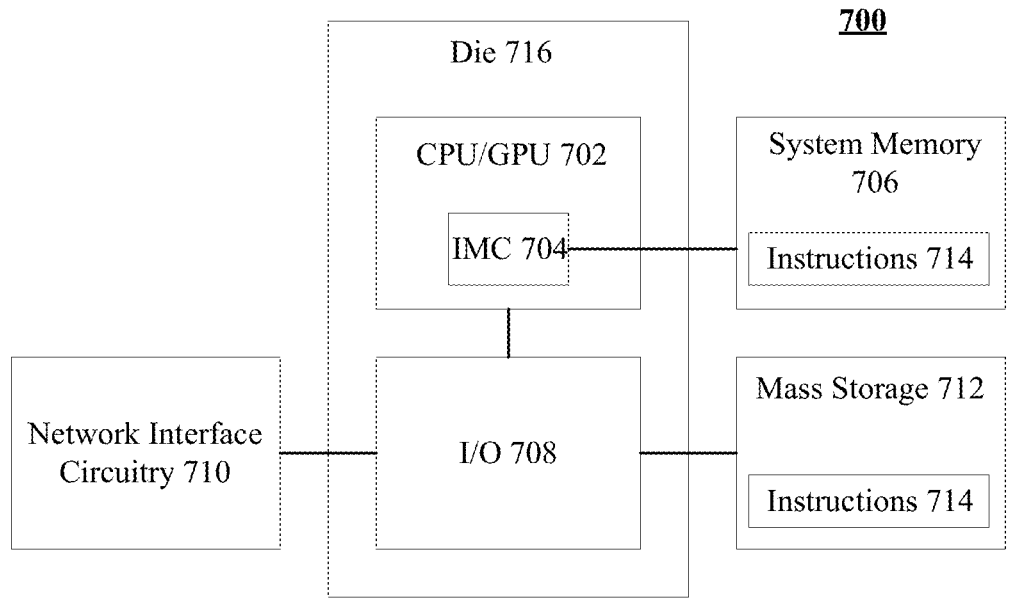
FIG. 7 shows a system that may be readily substituted for an image processing system having an adversarial control network according to an embodiment.

FIG. 7 shows a system 700 that may be readily substituted for the image processing system having an adversarial control network as shown above with reference to FIG. 5A. The illustrated system 700 includes a central processing unit/CPU coupled to a graphics processing unit/GPU, shown as CPU/GPU processors 702 having an integrated memory controller (IMC) 704 coupled to a system memory 706 (e.g., volatile memory, 3D)(Point memory, dynamic random access memory/DRAM). The CPU/GPU processors 702 may each include a core region with one or more processor cores (not shown). The CPU/GPU processors 702 may also be coupled to an input/output (I/O) module 708 that communicates with network interface circuitry 710 (e.g., network controller, network interface card/NIC) and mass storage 712 (non-volatile memory/NVM, hard disk drive/HDD, optical disk, solid state disk/SSD, flash memory). The network interface circuitry 710 may receive images such as, for example, input image 502 (shown in FIG. 5), wherein the system memory 706 and/or the mass storage 712 may be memory devices that store instructions 714, which when executed by the CPU/GPU processors 702, cause the system 700 to perform one or more aspects of the methods 200 (FIG. 2), 204 (FIGS. 3A and 3B), 206 (FIGS. 4A and 4B), and 208 (FIGS. 5A and 5B), already discussed. Thus, execution of the instructions 714 may cause the system 700 to process an input image, send the processed input image to an adversarial control network to assess the probability of the processed input image having visual artifacts, use the output from the adversarial control network as an input to the control logic of the image processing system to tune the correction strength of the image processing system, and process the input image to obtain an artifact free output image. The CPU/GPU processors 702 and the IO module 708 may be incorporated into a shared die 716 as a system on chip (SoC).

Figure 8:
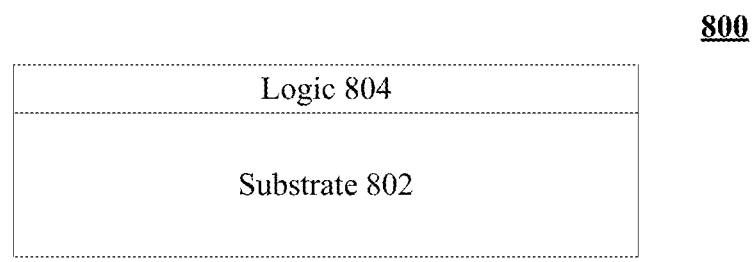
FIG. 8 is an illustration of an example of a semiconductor package apparatus according to an embodiment.

FIG. 8 shows a semiconductor package apparatus 800 (e.g., chip) that includes a substrate 802 (e.g., silicon, sapphire, gallium arsenide) and logic 804 (e.g., transistor array and other integrated circuit/IC components) coupled to the substrate 802. The logic 804, which may be implemented in configurable logic and/or fixed-functionality logic hardware, may generally implement one or more aspects of the methods 200 (FIG. 2), 204 (FIGS. 3A and 3B), 206 (FIGS. 4A and 4B), and 208 (FIGS. 5A and 5B), already discussed.

Figure 9:
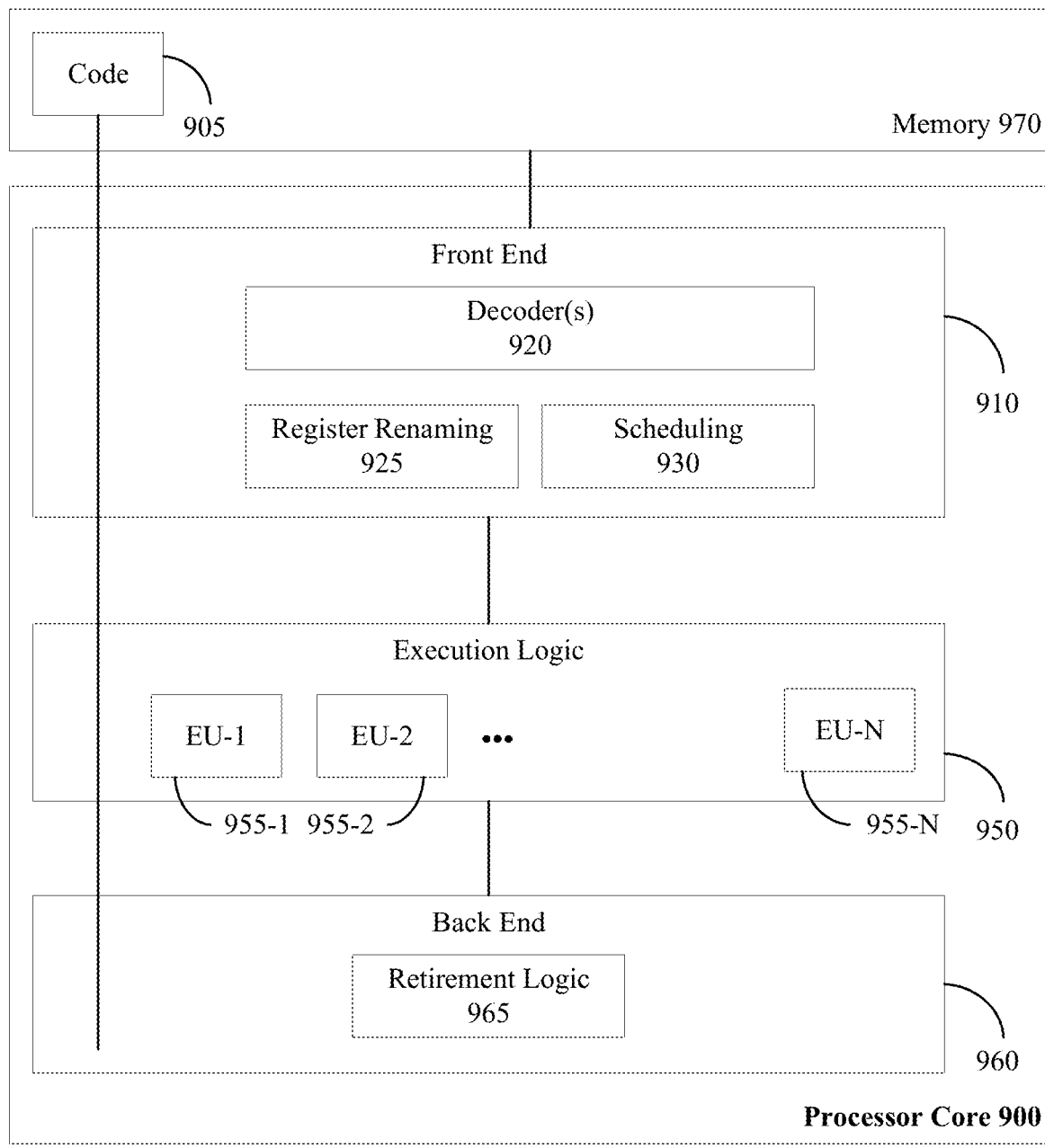
FIG. 9 is a block diagram of an exemplary processor according to an embodiment.

FIG. 9 illustrates a processor core 900 according to one embodiment. The processor core 900 may be the core for any type of processor, such as a micro-processor, an embedded processor, a digital signal processor (DSP), a network processor, or other device to execute code. Although only one processor core 900 is illustrated in FIG. 9, a processing element may alternatively include more than one of the processor core 900 illustrated in FIG. 9. The processor core 900 may be a single-threaded core or, for at least one embodiment, the processor core 900 may be multithreaded in that it may include more than one hardware thread context (or "logical processor") per core.

FIG. 9 also illustrates a memory 970 coupled to the processor core 900. The memory 970 may be any of a wide variety of memories (including various layers of memory hierarchy) as are known or otherwise available to those of skill in the art. The memory 970 may include one or more code 905 instruction(s) to be executed by the processor core 900, wherein the code 905 may implement the methods 200 (FIG. 2), 204 (FIGS. 3A and 3B), 206 (FIGS. 4A and 4B), and 208 (FIGS. 5A and 5B), already discussed. The processor core 900 follows a program sequence of instructions indicated by the code 905. Each instruction may enter a front end portion 910 and be processed by one or more decoders 920. The decoder 920 may generate as its output a micro operation such as a fixed width micro operation in a pre-defined format, or may generate other instructions, micro-instructions, or control signals which reflect the original code instruction. The illustrated front end portion 910 also includes register renaming logic 925 and scheduling logic 930, which generally allocate resources and queue the operation corresponding to the convert instruction for execution.

The processor core 900 is shown including execution logic 850 having a set of execution units 955-1 through 955-N. Some embodiments may include a number of execution units dedicated to specific functions or sets of functions. Other embodiments may include only one execution unit or one execution unit that can perform a particular function. The illustrated execution logic 950 performs the operations specified by code instructions.

After completion of execution of the operations specified by the code instructions, back end logic 960 retires the instructions of the code 905. In one embodiment, the processor core 900 allows out of order execution but requires in order retirement of instructions. Retirement logic 965 may take a variety of forms as known to those of skill in the art (e.g., re-order buffers or the like). In this manner, the processor core 900 is transformed during execution of the code 905, at least in terms of the output generated by the decoder, the hardware registers and tables utilized by the register renaming logic 925, and any registers (not shown) modified by the execution logic 950.

Although not illustrated in FIG. 9, a processing element may include other elements on chip with the processor core 900. For example, a processing element may include memory control logic along with the processor core 900. The processing element may include I/O control logic and/or may include I/O control logic integrated with memory control logic. The processing element may also include one or more caches.

Figure 10:
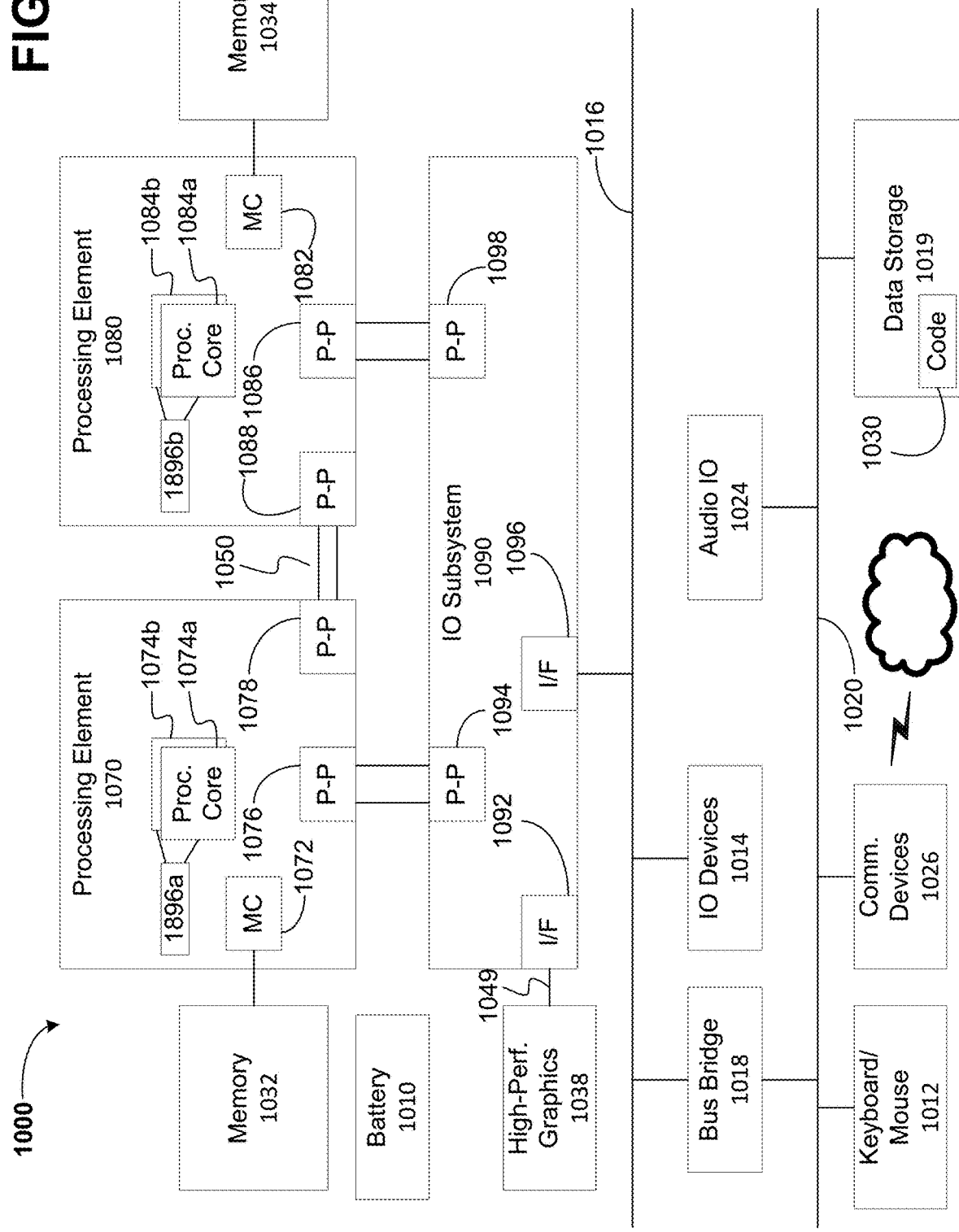
FIG. 10 is a block diagram of an exemplary computing system according to an embodiment.

Referring now to FIG. 10, shown is a block diagram of a computing system 1000 in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the methods 200 (FIG. 2), 204 (FIGS. 3A and 3B), 206 (FIGS. 4A and 4B), and 208 (FIGS. 5A and 5B), already discussed, and may be similar to the code 905 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes at least one computer readable medium, comprising a set of instructions, which when executed by one or more computing devices, cause the one or more computing devices to create an annotated dataset of images to be processed by an image processing system, train an adversarial control network to operate as an image quality expert in classifying images and after the adversarial control network has been trained, use the adversarial control network to supervise the image processing system on-the-fly.

Example 2 includes the at least one computer readable medium of Example 1, wherein the adversarial control network runs parallel with the image processing system to provide supervision.

Example 3 includes the at least one computer readable medium of Example 1, wherein instructions to create an annotated dataset of images comprises instructions to receive, by the image processing system, images from a dataset, process the images from the dataset and store processed images in a database to enable an image quality expert to categorize the processed images into well-processed images and poorly-processed images.

Example 4 includes the at least one computer readable medium of Example 3, wherein the poorly-processed images include noticeable artifacts and the well-processed images do not include noticeable artifacts.

Example 5 includes the at least one computer readable medium of Example 1, wherein the adversarial control network comprises a convolutional neural network.

Example 6 includes the at least one computer readable medium of Example 1, wherein instruction to train the adversarial control network comprises instructions to receive, by the adversarial control network, poorly processed images and well processed images, wherein an optimizer tunes the parameters of the adversarial control network to cause the adversarial control network to output a good label for the well processed images and a bad label for poorly processed images.

Example 7 includes the at least one computer readable medium of Example 1, wherein instructions to use the adversarial control network to supervise the image processing system on the fly comprises instructions to receive, by the image processing system, an input image to be processed, process the input image to send as a preliminary output image to the adversarial control network, wherein the adversarial control network determines a probability of the preliminary output image having one or more artifacts, use the probability of the preliminary output image having one or more artifacts to tune control strength of the image processing system and reprocess the input image using the image processing system after being tuned to obtain an artifact free output image.

Example 8 includes the at least one computer readable medium of Example 1, wherein instructions to use the adversarial control network to supervise the image processing system on the fly comprises instructions to receive, by the image processing system, an input image to be processed, process the input image to send as a preliminary output image to the adversarial control network, wherein the adversarial control network determines a probability of the preliminary output image having one or more artifacts, output the input image as an artifact free output image when the probability of the preliminary output image having one or more artifacts is greater than a predetermined threshold and output the preliminary output image as the artifact free output image when the probability of the preliminary output image having one or more artifacts is less than a predetermined threshold.

Example 9 includes a method of attenuating visual artifacts in processed images comprising creating an annotated dataset of images to be processed by an image processing system, training an adversarial control network to operate as an image quality expert in classifying images and after the adversarial control network has been trained, using the adversarial control network to supervise the image processing system on-the-fly.

Example 10 includes the method of Example 9, wherein the adversarial control network runs parallel with the image processing system to provide supervision.

Example 11 includes the method of Example 9, wherein creating an annotated dataset of images comprises receiving, by the image processing system, images from a dataset, processing the images from the dataset and storing processed images in a database to enable an image quality expert to categorize the processed images into well-processed images and poorly-processed images.

Example 12 includes the method of Example 11, wherein the poorly-processed images include noticeable artifacts and the well-processed images do not include noticeable artifacts.

Example 13 includes the method of Example 9, wherein the adversarial control network comprises a convolutional neural network.

Example 14 includes the method of Example 9, wherein training the adversarial control network comprises receiving, by the adversarial control network, poorly processed images and well processed images, wherein an optimizer tunes the parameters of the adversarial control network to cause the adversarial control network to output a good label for the well processed images and a bad label for poorly processed images.

Example 15 includes the method of Example 9, wherein using the adversarial control network to supervise the image processing system on the fly comprises receiving, by the image processing system, an input image to be processed, processing the input image to send as a preliminary output image to the adversarial control network, wherein the adversarial control network determines a probability of the preliminary output image having one or more artifacts, using the probability of the preliminary output image having one or more artifacts to tune control strength of the image processing system and reprocessing the input image using the image processing system after being tuned to obtain an artifact free output image.

Example 16 includes the method of Example 9, wherein using the adversarial control network to supervise the image processing system on the fly comprises receiving, by the image processing system, an input image to be processed, processing the input image to send as a preliminary output image to the adversarial control network, wherein the adversarial control network determines a probability of the preliminary output image having one or more artifacts, outputting the input image as an artifact free output image when the probability of the preliminary output image having one or more artifacts is greater than a predetermined threshold, and outputting the preliminary output image as the artifact free output image when the probability of the preliminary output image having one or more artifacts is less than a predetermined threshold.

Example 17 includes an apparatus to attenuate visual artifacts in processed images comprising one or more substrates and logic coupled to the one or more substrates, wherein the logic includes one or more of configurable logic or fixed-functionality hardware logic, the logic coupled to the one or more substrates to create an annotated dataset of images to be processed by an image processing system, train an adversarial control network to operate as an image quality expert in classifying images and after the adversarial control network has been trained, use the adversarial control network to supervise the image processing system on-the-fly.

Example 18 includes the apparatus of Example 17, wherein the adversarial control network runs parallel with the image processing system to provide supervision.

Example 19 includes the apparatus of Example 17, wherein logic to create an annotated dataset of images comprises logic to receive, by the image processing system, images from a dataset, process the images from the dataset and store processed images in a database to enable an image quality expert to categorize the processed images into well-processed images and poorly-processed images.

Example 20 includes the apparatus of Example 19, wherein the poorly-processed images include noticeable artifacts and the well-processed images do not include noticeable artifacts.

Example 21 includes the apparatus of Example 17, wherein the adversarial control network comprises a convolutional neural network.

Example 22 includes the apparatus of Example 17, wherein logic to train the adversarial control network comprises logic to receive, by the adversarial control network, poorly processed images and well processed images, wherein an optimizer tunes the parameters of the adversarial control network to cause the adversarial control network to output a good label for the well processed images and a bad label for poorly processed images.

Example 23 includes the apparatus of Example 17, wherein logic to use the adversarial control network to supervise the image processing system on the fly comprises logic to receive, by the image processing system, an input image to be processed, process the input image to send as a preliminary output image to the adversarial control network, wherein the adversarial control network determines a probability of the preliminary output image having one or more artifacts, use the probability of the preliminary output image having one or more artifacts to tune control strength of the image processing system and reprocess the input image using the image processing system after being tuned to obtain an artifact free output image.

Example 24 includes the apparatus of Example 17, wherein logic to use the adversarial control network to supervise the image processing system on the fly comprises logic to receive, by the image processing system, an input image to be processed, process the input image to send as a preliminary output image to the adversarial control network, wherein the adversarial control network determines a probability of the preliminary output image having one or more artifacts, output the input image as an artifact free output image when the probability of the preliminary output image having one or more artifacts is greater than a predetermined threshold and output the preliminary output image as the artifact free output image when the probability of the preliminary output image having one or more artifacts is less than a predetermined threshold.

Example 25 includes a system for attenuating visual artifacts in processed images comprising an image processing system to process input images and an adversarial control network to run in parallel with the image processing system to supervise the image processing system, wherein the adversarial control network to determine a probability of a processed output image from the image processing system having one or more artifacts and use the probability of the processed output image having one or more artifacts to tune control strength of the image processing system.

Example 26 includes the system of Example 25, wherein the adversarial control network comprises a convolutional neural network.

Example 27 includes the system of Example 25, wherein, prior to use of the adversarial control network, the adversarial control network to be trained to operate as a image quality expert in classifying images into categories of well-processed images and poorly-processed images, wherein the poorly-processed images include noticeable artifacts and the well-processed images do not include noticeable artifacts.

Example 28 includes the system of Example 25, wherein the image processing system, after being tuned using the probability of the processed output image, to reprocess the input image to obtain an artifact free output image.

Example 29 includes an apparatus to attenuate visual artifacts in processed images comprising means for creating an annotated dataset of images to be processed by an image processing system, means for training an adversarial control network to operate as an image quality expert in classifying images and after the adversarial control network has been trained, means for using the adversarial control network to supervise the image processing system on-the-fly.

Example 30 includes the apparatus of Example 29, wherein the adversarial control network runs parallel with the image processing system to provide supervision.

Example 31 includes the apparatus of Example 29, wherein means for creating an annotated dataset of images comprises means for receiving, by the image processing system, images from a dataset, means for processing the images from the dataset and means for storing processed images in a database to enable an image quality expert to categorize the processed images into well-processed images and poorly-processed images.

Example 32 includes the apparatus of Example 31, wherein the poorly-processed images include noticeable artifacts and the well-processed images do not include noticeable artifacts.

Example 33 includes the apparatus of Example 29, wherein the adversarial control network comprises a convolutional neural network.

Example 34 includes the apparatus of Example 29, wherein means for training the adversarial control network comprises means for receiving, by the adversarial control network, poorly processed images and well processed images, wherein an optimizer tunes the parameters of the adversarial control network to cause the adversarial control network to output a good label for the well processed images and a bad label for poorly processed images.

Example 35 includes the apparatus of Example 29, wherein means for using the adversarial control network to supervise the image processing system on the fly comprises means for receiving, by the image processing system, an input image to be processed, means for processing the input image to send as a preliminary output image to the adversarial control network, wherein the adversarial control network determines a probability of the preliminary output image having one or more artifacts, means for using the probability of the preliminary output image having one or more artifacts to tune control strength of the image processing system and means for reprocessing the input image using the image processing system after being tuned to obtain an artifact free output image.

Example 36 includes the apparatus of Example 29, wherein means for using the adversarial control network to supervise the image processing system on the fly comprises means for receiving, by the image processing system, an input image to be processed, means for processing the input image to send as a preliminary output image to the adversarial control network, wherein the adversarial control network determines a probability of the preliminary output image having one or more artifacts, means for outputting the input image as an artifact free output image when the probability of the preliminary output image having one or more artifacts is greater than a predetermined threshold and means for outputting the preliminary output image as the artifact free output image when the probability of the preliminary output image having one or more artifacts is less than a predetermined threshold.

Example 37 includes at least one computer readable medium comprising a set of instructions, which when executed by a computing system, cause the computing system to perform the method of any one of Examples 9 to 16.

Example 38 includes an apparatus comprising means for performing the method of any one of Examples 9 to 16.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines.

Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. At least one non-transitory computer readable medium, comprising a set of instructions, which when executed by one or more computing devices, cause the one or more computing devices to:
create an annotated dataset of images to be processed by an image processing system;
train an adversarial control network to operate as an image quality expert in classifying images; and
use the adversarial control network to supervise the image processing system on-the-fly, wherein instructions to use the adversarial control network to supervise the image processing system on-the-fly cause the one or more computing devices to:
receive, by the image processing system, an input image to be processed;
process the input image to send as a preliminary output image to the adversarial control network, wherein the adversarial control network determines a probability of the preliminary output image having one or more artifacts;
if the image processing system does not include control logic that allows adjustment of the control strength of the image processing system,
output the input image as an artifact free output image when the probability of the preliminary output image having one or more artifacts is greater than a predetermined threshold; and
output the preliminary output image as the artifact free output image when the probability of the preliminary out image having one or more artifacts is less than a predetermined threshold.

2. The at least one non-transitory computer readable medium of claim 1, wherein the adversarial control network runs parallel with the image processing system to provide supervision.

3. The at least one non-transitory computer readable medium of claim 1, wherein instructions to create an annotated dataset of images comprises instructions to:
receive, by the image processing system, images from a dataset;
process the images from the dataset; and
store processed images in a database to enable an image quality expert to categorize the processed images into well-processed images and poorly-processed images.

4. The at least one non-transitory computer readable medium of claim 3, wherein the poorly-processed images include noticeable artifacts and the well-processed images do not include noticeable artifacts.

5. The at least one non-transitory computer readable medium of claim 1, wherein the adversarial control network comprises a convolutional neural network.

6. The at least one non-transitory computer readable medium of claim 1, wherein instructions to train the adversarial control network comprises instructions to:
receive, by the adversarial control network, poorly processed images and well processed images, wherein an optimizer tunes the parameters of the adversarial control network to cause the adversarial control network to output a good label for the well processed images and a bad label for the poorly processed images.

7. The at least one computer readable medium of claim 1, wherein if the image processing system includes control logic that allows adjustment of the control strength of the image processing system,
use the probability of the preliminary output image having one or more artifacts to tune control strength of the image processing system; and
reprocess the input image using the image processing system after being tuned to obtain an artifact free output image.

8. A method of attenuating visual artifacts in processed images comprising:
creating an annotated dataset of images to be processed by an image processing system;
training an adversarial control network to operate as an image quality expert in classifying images;
using the adversarial control network to supervise the image processing system on-the-fly, wherein using the adversarial control network comprises:
receiving, by the image processing system, an input image to be processed;
processing the input image to send as a preliminary output image to the adversarial control network;
wherein the adversarial control network determines a probability of the preliminary output image having one or more artifacts;
if the image processing system does not include control logic that allows adjustment of the control strength of the image processing system,
outputting the input image as an artifact free output image when the probability of the preliminary output image having one or more artifacts is greater than a predetermined threshold; and
outputting the preliminary output image as the artifact free output image when the probability of the preliminary output image having one or more artifacts is less than a predetermined threshold.

9. The method of claim 8, wherein the adversarial control network runs parallel with the image processing system to provide supervision.

10. The method of claim 8, wherein creating an annotated dataset of images comprises:
receiving, by the image processing system, images from a dataset;
processing the images from the dataset; and
storing processed images in a database to enable an image quality expert to categorize the processed images into well-processed images and poorly-processed images.

11. The method of claim 10, wherein the poorly-processed images include noticeable artifacts and the well-processed images do not include noticeable artifacts.

12. The method of claim 8, wherein the adversarial control network comprises a convolutional neural network.

13. The method of claim 8, wherein training the adversarial control network comprises:
receiving, by the adversarial control network, poorly processed images and well processed images, wherein an optimizer tunes the parameters of the adversarial control network to cause the adversarial control network to output a good label for the well processed images and a bad label for poorly processed images.

14. The method of claim 8, wherein if the image processing system includes control logic that allows adjustment of the control strength of the image processing system,
using the probability of the preliminary output image having one or more artifacts to tune control strength of the image processing system; and
reprocessing the input image using the image processing system after being tuned to obtain an artifact free output image.

15. An apparatus to attenuate visual artifacts in processed images comprising:
one or more substrates; and
logic coupled to the one or more substrates, wherein the logic includes one or more of configurable logic or fixed-functionality hardware logic, the logic coupled to the one or more substrates to:
create an annotated dataset of images to be processed by an image processing system;
train an adversarial control network to operate as an image quality expert in classifying images;
use the adversarial control network to supervise the image processing system on-the-fly, wherein logic to use the adversarial control network to supervise the image processing system on-the-fly comprises logic to:
receive, by the image processing system, an input image to be processed;
process the input image to send as a preliminary output image to the adversarial control network;

wherein the adversarial control network determines a probability of the preliminary output image having one or more artifacts;

if the image processing system does not include control logic that allows adjustment of the control strength of the image processing system, output the input image as an artifact free output image when the probability of the preliminary output image having one or more artifacts is greater than a predetermined threshold; and output the preliminary output image as the artifact free output image when the probability of the preliminary output image having one or more artifacts is less than a predetermined threshold.

16. The apparatus of claim 15, wherein the adversarial control network runs parallel with the image processing system to provide supervision.

17. The apparatus of claim 15, wherein logic to create an annotated dataset of images comprises logic to:

receive, by the image processing system, images from a dataset;

process the images from the dataset; and store processed images in a database to enable an image quality expert to categorize the processed images into well-processed images and poorly-processed images.

18. The apparatus of claim 17, wherein the poorly-processed images include noticeable artifacts and the well-processed images do not include noticeable artifacts.

19. The apparatus of claim 15, wherein the adversarial control network comprises a convolutional neural network.

20. The apparatus of claim 15, wherein logic to train the adversarial control network comprises logic to:

receive, by the adversarial control network, poorly processed images and well processed images, wherein an optimizer tunes the parameters of the adversarial control network to cause the adversarial control network to output a good label for the well processed images and a bad label for poorly processed images.

21. The apparatus of claim 15, wherein if the image processing system includes control logic that allows adjustment of the control strength of the image processing system, use the probability of the preliminary output image having one or more artifacts to tune control strength of the image processing system; and reprocess the input image using the image processing system after being tuned to obtain an artifact free output image.

* * * * *